April 18, 1944.  Z. AUERBACH  2,347,021
CONTAINER
Filed Jan. 29, 1938  5 Sheets-Sheet 1

INVENTOR.
ZEMACH AUERBACH
BY Irving Seidman
HIS ATTORNEY.

April 18, 1944. Z. AUERBACH 2,347,021
CONTAINER
Filed Jan. 29, 1938 5 Sheets-Sheet 3

INVENTOR.
ZEMACH AUERBACH
BY Irving Seidman
HIS ATTORNEY.

April 18, 1944.　　　Z. AUERBACH　　　2,347,021
CONTAINER
Filed Jan. 29, 1938　　　5 Sheets-Sheet 5

INVENTOR.
ZEMACH AUERBACH
BY Irving Seidman
ATTORNEY.

Patented Apr. 18, 1944

2,347,021

UNITED STATES PATENT OFFICE 2,347,021

CONTAINER

Zemach Auerbach, New York, N. Y.

Application January 29, 1938, Serial No. 187,671

6 Claims. (Cl. 206—56)

This invention relates to containers for articles and for consecutively removing such articles without opening the container.

Broadly, it is an object of this invention to provide a container which can be economically produced, neat in appearance and simple in construction and from which articles may be consecutively removed without opening the container so that a user may be provided with more sanitary articles.

Another object of this invention is to provide a container for articles from which such articles may be consecutively removed without opening the container, and the number of remaining articles can be readily ascertained at a glance.

More specifically, it is an object of this invention to provide a container for consecutively dispensing and storing such used articles without opening the container.

Another object of this invention is to provide a container for consecutively dispensing articles and in which such articles may be stored with safety without opening the container.

Another object of this invention is to provide a safety razor blade container for consecutively dispensing wrapped razor blades and for readily discarding used razor blades with safety without opening the container.

Another object of this invention is to produce a razor blade container so economically that when all the wrapped blades have been used and the used blades deposited within the container, the entire container may be discarded without regret.

These important features are accomplished by the novel constructions and combination of parts as hereinafter described and shown in the accompanying drawings forming a part of this specification, in which.

Figures 1, 2, 3, 4, 5, 6, 12:
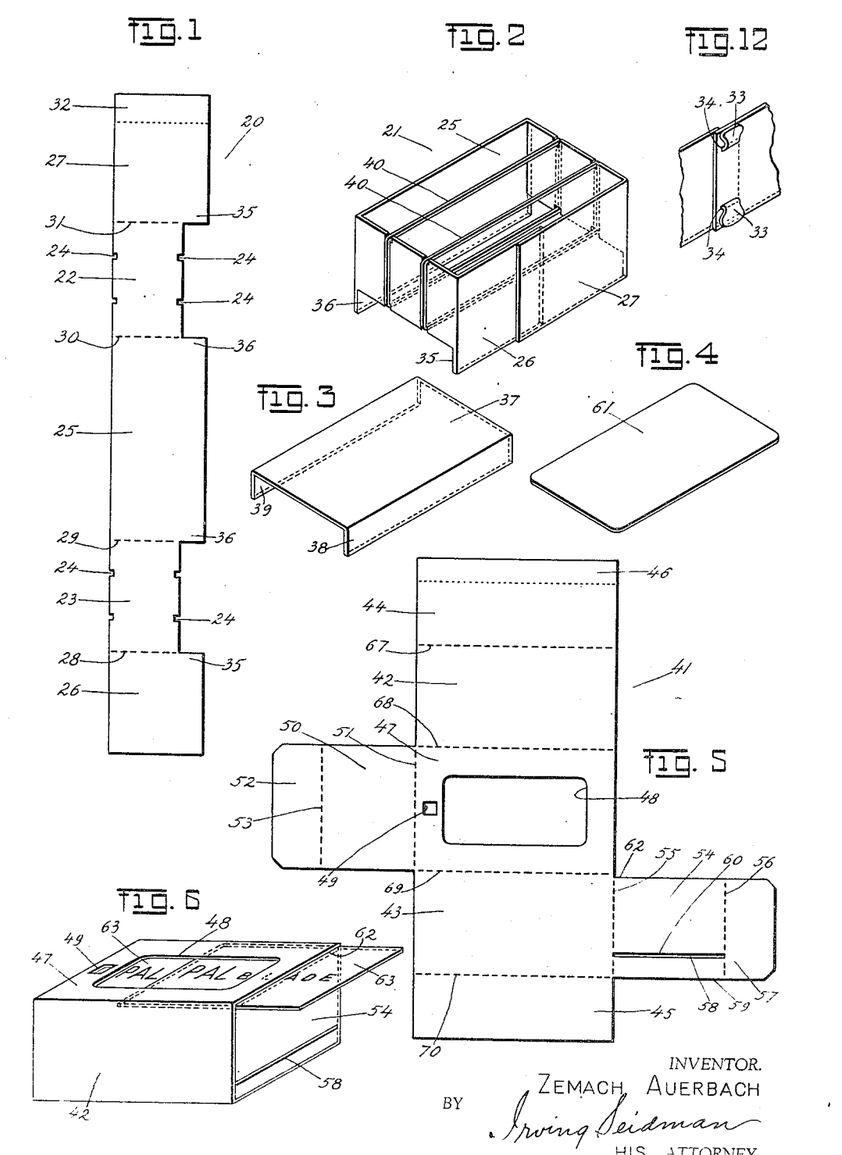
Fig. 1 is a plan view of a blank prior to folding of the inner structure unit of the container.
Fig. 2 is a perspective view of the inner structure unit with the razor blades in position within the notches of the sides.
Fig. 3 is a perspective view of a movable platform.
Fig. 4 is a perspective view of a support for a stack of razor blades.
Fig. 5 is a plan view of a blank prior to folding of the outer structure unit, showing the windows, used blade slot and folding and pasting lines.
Fig. 6 is a perspective view of the container loaded with wrapped blades, showing a wrapped blade being partly removed through the slot.
Fig. 12 is a perspective view of a tongue and slot means of joining the sides of the inner structure unit.
Figure 7:
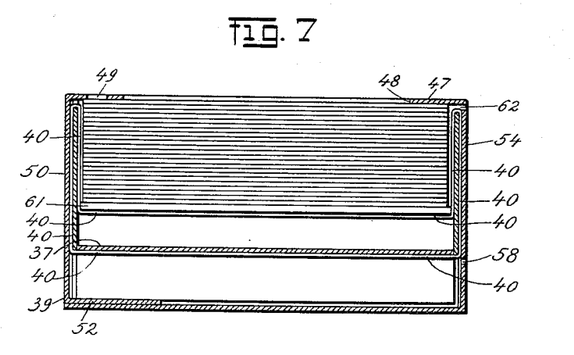
Fig. 7 is an enlarged longitudinal section through the container.

Referring to the drawings by numerals, 20 indicates a blank to form an inner structure unit 21 formed preferably of cardboard or other suitable material, as shown in Fig. 1. This blank 20 may consist of two short sides 22 and 23 with notches 24 and a long rectangular side 25 and two shorter sides 26 and 27 which are formed overlapping one another to form a side equal in length to long side 25. Blank 20 is creased at 28, 29, 30 and 31 to form the four sides of the inner structure unit 21. The long rectangular side 25 and shorter sides 26 and 27 are of the same width and notched sides 22 and 23 are equal in size and shorter in width than sides 25, 26 and 27. Portion 32 of side 27 may be joined with side 26 by pasting, stapling or tabs 33 to pass through slots 34, as shown in Fig. 12 or any other desirable joining means. When sides 26 and 27 are joined together, a rectangular unit is formed, having no top or bottom, the long sides forming legs 35 and 36, as shown in Fig. 2.

A platform 37, preferably formed of cardboard, or other suitable material and being creased longitudinally to form two long narrow legs 38 and 39 so that the inner sides of legs 38 and 39 are the same height as the legs 35 and 36 of the sides of the inner structure unit 21. That is, when the platform rests upon its legs 38 and 39, the bottom of platform 37 reaches the lower end of notched sides 22 and 23. The platform 37 is made to fit within the rectangular inner structure unit 21, the legs 38 and 39 being placed vertically down.

When the platform 37 is placed within the inner structure unit 21, it holds the sides of the inner structure unit in rectangular position, forming an inner support.

Elastic bands 40 are placed in the notches 24 in position parallel to the long sides of the inner structure unit 21, running around the short sides 22 and 23 and parallel to the long sides of the inner structure unit 21, and are of a length to be under slight tension. The platform 37 prevents the razor blades from forcing the sides of the inner structure unit together.

Referring to Fig. 5, blank 41, formed preferably of cardboard or other suitable material, forms the outer cover of the container. This blank may consist of rectangular sides 42 formed by creases 67 and 68 and 43 formed by creases 69 and 70. Sides 42 and 43 are of the same size. Rectangular pieces 44 and 45 which overlap one another form the bottom of the outer cover. The rectangular pieces 44 and 45 may be of the same width or one may be wider than the other to form the overlapping portion 46, as shown in Fig. 5. Pieces 44 and 45 may be joined by pasting, stapling, tabs passing through slots, or may be joined in any other desirable manner. A central rectangular portion 47 forms the top of the outer cover 41 which may have a large window 48 cut-out. This window 48 may be cut out in any form for ornamental purposes. Another small window 49 may also be cut out near the margin so that a number of characters may be seen through it. An end flap 50 extends from one side of the top 47 and is creased at 51 to form an end side of the outer cover 41. A flap 52 is provided at the end of side 50 which is formed by crease 53. Flap 52 is folded into the outer cover 41. Another end flap 54 extends from the opposite side of one of the rectangular sides 43. Flap 57 is creased at 56 and folded into the outer cover 41. The flap 54 is lesser in width than side 43; being shorter at the side nearest the central rectangle forming the top, thus providing a slot 62 as shown in Fig. 6 when the flap 54 is folded into the outer cover 41. A long slot 58 is cut parallel to end 59 and far enough from it so that the side 60 of slot 58 nearest the top is the same distance as the height of legs 35 and 36.

Figures 10, 11, 14:
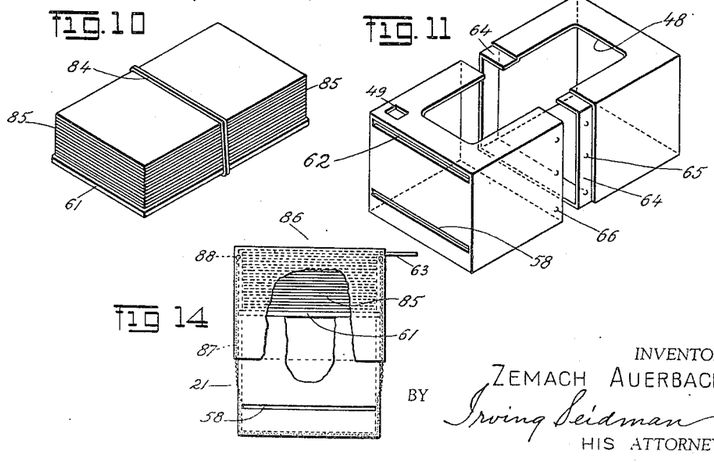
Fig. 10 is a perspective view of a stack of razor blades upon a support held by an elastic band.
Fig. 11 is a perspective view of another modification of an outer structure unit.
Fig. 14 is an end view partly broken away of another modification of the container, showing the parts held together.
Figure 15:
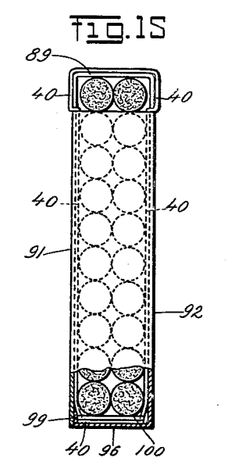
Fig. 15 is an end view of a container partly broken away, showing the parts held together.
Figure 16:
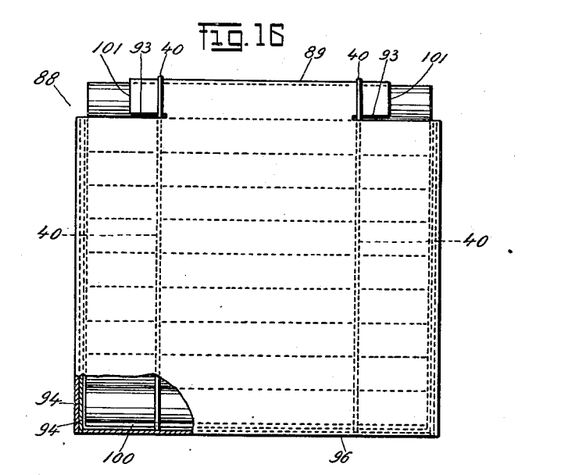
Fig. 16 is a side view of the container shown in Fig. 15, partly broken away and showing the parts held together.
Figure 17:
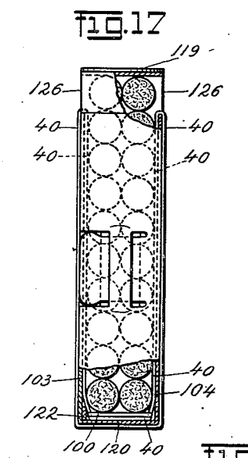
Fig. 17 is an end view of another container partly broken away, showing the parts held together.

Referring to Fig. 11 another type of outer cover is shown. This cover may be formed of metal, plastic, or any other type of suitable material. This cover is divided in halves along the central portion and is joined together by a depressed flange 64 at the edge of the central portion of one half of the cover unit, telescoping within the other edge of the opposite half unit. The two halves of the outer cover is held together by friction and by male knubs 65 coacting with female depressions 66. The top of this cover has a large window 48 in the central portion thereof and a small window 49 cut out in a corner. This small window 49 may also be cut out along any part of the margin of the top. A slot 58 may be cut in an end side of the outer cover in a similar position as described above and shown in Figs. 5 and 6.

To assemble the razor blade container, the blank 20 is creased along lines 28, 29, 30 and 31 and portion 32 is pasted to side 26 to form the rectangular inner structure unit; the inner area of which is slightly larger than a wrapped razor blade of the standard size used. Platform 37 is then placed within the unit 21 with legs 38 and 39 in downward position, as shown in Fig. 3. Elastic bands 40 are then placed into the notches 24 so that they run around the short sides 22 and 23 and run parallel to the long side 25. A stack of wrapped razor blades is then placed upon a razor blade support 61 as shown in Fig. 4, which may be of cardboard or other suitable material and which fits within the inner structure 21. However, the support 61 may be eliminated if desired. The stack of blades and support 61 is then placed on top of the elastic bands 40 and pressed downwardly into the inner structure unit 21 and against the upward pressure of the elastic bands 40 until the top blade rests evenly with the top of the sides of the unit 21. The stack of blades is held in this position within the inner structure by the pressure of the index finger. The unit 21 containing the blades is then placed within the outer cover 41 through one of the ends and such ends are then closed by inserting the flaps 52 and 57 within the outer cover 41.

The upper blade 63 is now in position beneath the large window 48, the short side of the blade being adjacent slot 62 ready for removal. This blade may be removed by the finger being inserted through the open window 48 and a slight downward pressure of the finger exerted against the blade moving the blade toward the open slot 62. As each blade is removed, the elastic bands 40 raise the platform evenly in horizontal position bringing the uppermost blade in correct position adjacent the slot 62 ready for subsequent removal from the container.

The wrappers of the blades have consecutive numbers printed thereon, the first number being on the lowest wrapper. Such numbers are so placed upon the wrappers so that they appear within the small window 49 as the blade rises to its uppermost position, indicating the number of unused blades remaining within the container.

When a blade is ready to be discarded, it may be inserted through slot 58 to fall within the compartment for used blades formed below the movable platform 37.

When all the blades have been used and stored within the compartment for used blades, the entire container with the used blades may be discarded. Thus used blades are stored with safety in the home without risking the danger of being cut by a loose blade lying about.

The outer cover shown in Fig. 11 may be used in place of the outer cover shown in Fig. 6.

Figures 8, 9, 13:
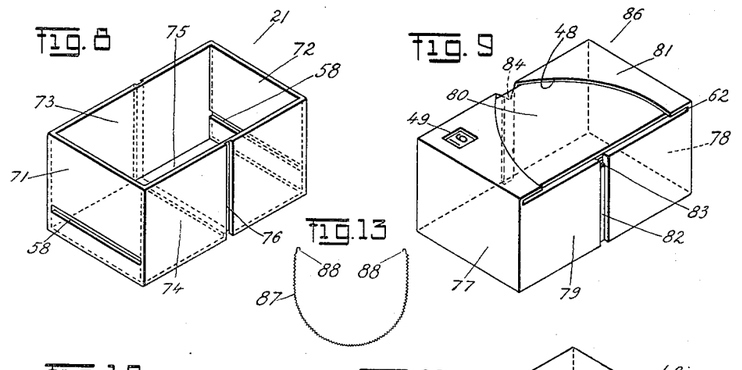
Fig. 8 is a perspective view of a modification of the inner structure unit.
Fig. 9 is a perspective view of a modification of the outer structure unit.
Fig. 13 is an elevation of a fine spring.

The inner structure unit, shown in Fig. 8, may be formed from a blank. It comprises two short sides 71 and 72, respectively and two long sides 73 and 74, respectively and a bottom 75. Each short side may have a slot 58 therein as shown in Fig. 8. The long sides 73 and 74 and the bottom 75 contain a groove 76 located in the center of said sides and bottom.

The outer cover 86, shown in Fig. 9, may be formed of a blank and comprises two short sides 77 and 78, respectively and two long sides 79 and 80, respectively, and a top 81. The top 81 contains a large cutout window 48 which may be of any desirable shape and a small cutout window 49 near the margin of the cover. The long side 79 of the cover contains a slot 62 for the removing of the wrapped razor blades. In the center of the long sides 79 and 80, there are grooves 82. At the top of grooves 82, there are notches 83 and 84.

To assemble the container shown in Figs. 8 and 9, a stack of wrapped razor blades 85 is placed upon a support 61, similar to that shown in Fig. 4, of a rectangular shape and the size of the outside dimensions of the inner structure unit, shown in Fig. 8. An elastic band 84 is then placed around the center of the longer sides of the stack of blades 85 and the support 61. The stack of blades and the support 61 are then placed upon the upper edges of the inner structure unit 21, shown in Fig. 8, in a position to conform with the outside edges of said unit 21. The outer cover 86 is then placed over the stack of blades 85 and upon the inner structure unit 21. The elastic band 84 then appears in the center of the large cutout window 48. The center of the elastic band 84 is then lifted over the sides of the outer cover 86 and across the center of the bottom 75 of the inner structure unit 21 and placed within the grooves 76 and 82 and notches 83 and 84.

The inner structure unit 21 is thereby securely held in position within the outer cover 86 by the elastic band 84, which exerts an upward pressure upon the razor blade support 61. Stack of blades 85 is thereby continually moved upward as each upper blade appearing beneath the window 48 is removed through the slot 62.

In assembling the container, as shown in Fig. 14, there is a difference in the assembly and the action of moving the blades to the desired position. The stack of blades 85 upon the support 61 is placed upon the top of the inner structure unit 21 and the outer cover 86 is telescoped over the blades and the inner structure unit 21. A fine spring 87, having hooks 88 on the ends thereof is hooked on by such ends into the notches 83 and 84 and lies within grooves 82 and 76, thus embracing and holding in movable relationship the inner structure unit 21 within the outer cover 86, thus moving the stack of blades continually upward as each top razor blade is removed.

Figure 20:
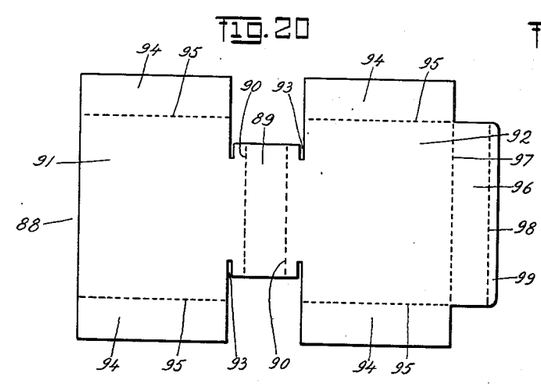
Fig. 20 is a plan view of a blank prior to folding of the outer structure of the container shown in Figs. 15 and 16.

Referring to Fig. 20, numeral 88 indicates a blank to form the outer structure of a container preferably formed of cardboard or other suitable material. This blank 88 comprises a center portion 89 having crease lines 90 forming the top of the container between said crease lines 90. On both sides of center portion 89, there are two larger portions 91 and 92 forming the sides of the container. Notches 92 are cut in the sides 91 and 92 and a short distance from the top 89. The ends 94 of the container are formed at the ends of the sides 91 and 92, divided by crease lines 95. The bottom 96 is formed at end of one of the sides 92, divided by crease line 97 and extending therefrom, divided by crease line 98, is a flap 99 which is folded into the container.

To assemble the container formed from the blank 88, the sides 91 and 92 are folded at crease lines 90 forming the top 89 and sides 91 and 92. The ends 94 are then folded at crease lines 95 overlapping one another and are joined together by pasting or other means. Since the top 89 is shorter in width than sides 91 and 92, openings 101 are formed.

Figure 21:
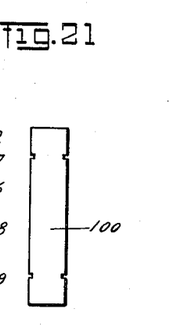
Fig. 21 is a plan view of a movable platform.

Articles, such as cigarettes, chewing gum or other articles, are assembled upon platform 100, as shown in Fig. 21, and elastic bands 40 are then placed around the articles and the platform 100 under slight tension. The articles upon the platform 100 are then placed within the container with the platform 100 near the open bottom 96. Portion 96 is then folded at crease line 97 to form the bottom and flap 99 is folded at crease line 98 and placed within the container. The elastic bands 40 now appearing at the top of the articles and within the openings 101 are lifted into the notches 93 and over the top 89. The articles appearing in the opening 101 are then in position for removing. As each layer of articles is removed, the succeeding layer automatically rises into the openings for subsequent removal.

Figures 22, 23, 24, 25:
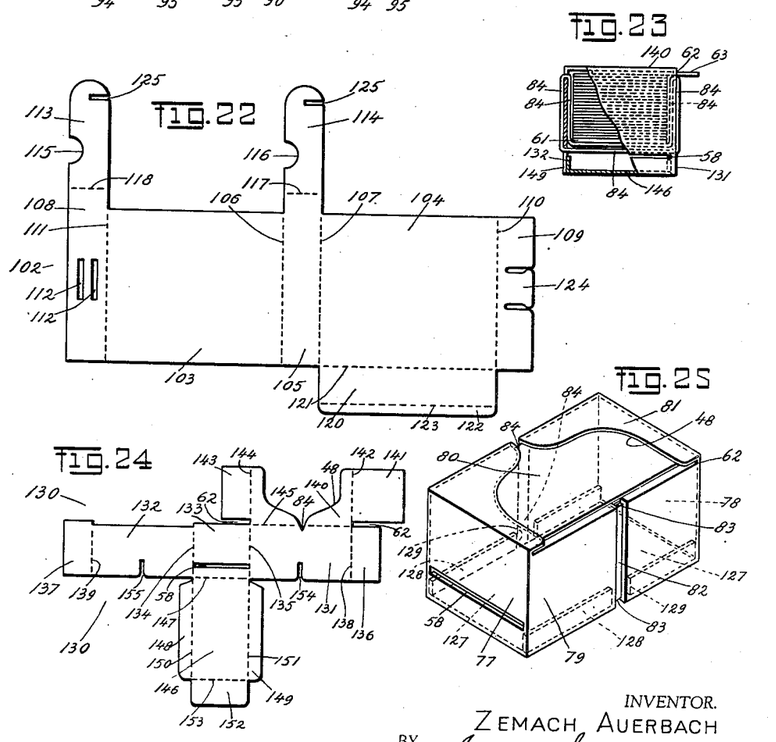
Fig. 22 is a plan view of a blank prior to folding of the outer structure of the container shown in Figs. 17 and 18.
Fig. 23 is an end view, partly broken away of another container showing the parts held together.
Fig. 24 is a plan view of a blank prior to folding of the outer structure of the container shown in Fig. 23.
Fig. 25 is a perspective view of a container with a removable bottom.

Referring to Fig. 22, numeral 102 indicates a blank to form the outer structure of a container preferably formed of cardboard or other suitable material. The blank 102 comprises two large portions 103 and 104 forming the sides and width of the container. Sides 103 and 104 are divided by a narrower portion 105 forming one side of the container and designated by crease lines 106 and 107. At the ends of sides 103 and 104 are narrow portions 108 and 109 of the same width as portion 105 divided by crease lines 110 and 111 and forming another side of the container. One of the portions 108 has a pair of slots 112 and the other portion 109 has a tongue 124 to interlock within the slots 112 to form the side of the container opposite side 105. Sides 108 and 109 may be joined together by any other desirable means.

Extending from sides 105 and 108 are two portions 113 and 114 of the same width as sides 108 and 105, respectively, forming the top 119 of the container and having finger notches 115 and 116, slots 125 and crease lines 117 and 118. Extending from the bottom of one of the sides 104 is another narrow portion 120 divided by a crease line 121 of the same width as side 105 and forming the bottom of the container and flap 122 divided by crease line 123.

To assemble the container formed from blank 102, the sides 103 and 104 are folded at crease lines 106 and 107, respectively, and sides 108 and 109 are folded at crease lines 111 and 110, respectively, overlapping one another and interlocked by inserting tongue 124 through slots 112 of side 108. Flap 122 is folded at crease line 123 and bottom 120 is folded at crease line 121 and the flap 122 is inserted into the container. Elastic bands 40 are then placed at a short distance from the sides 105 and 108 of the container over the open top of the wide portions forming the sides 103 and 104 and circling the open top, sides 103 and 104 and the closed bottom 120.

Articles are then assembled upon the support 100, as shown in Fig. 21 and the support 100 is placed together with the articles upon the elastic bands 40 and pressed into the container against the upwards force of the elastic bands 40. Top portions 113 and 114 are folded inwardly at crease lines 118 and 117, respectively and interlocked by notches 125, thus forming the top of the container. The articles appear within the openings 126 created by the crease lines 117 and 118 which are a short distance from the top of the sides 103 and 104 of the container.

The upward force of the elastic bands 40 against the bottom of support 100 causes the articles upon the support to be held in removable position at openings 126 formed at the top of the container. The articles may then be removed by inserting a finger within the finger notches 115 and 116 and removing the article through the opening 126. As each layer of articles is removed, the succeeding layer automatically rises into openings 126 for subsequent removal.

Referring to Fig. 25, a container is formed of any suitable material, such as cardboard, plastic or metal, comprising two short sides 77 and 78 and two long sides 79 and 80 and a top 81. The top 81 contains a large cutout window 48 which may be of any desirable shape. The long side 79 of the container has a slot 62 for removing articles. In the center of the long sides 79 and 80, there are grooves 82 and at the top and bottom of said grooves 82, there are notches 83 and 84.

In one of the short sides 77 there is an opening 58 near the bottom for inserting used articles. A bottom 127, having two sides 128 with cutouts 129 in the center of said sides, is inserted within the sides of the container.

To assemble the container shown in Fig. 25, articles are placed upon a support 61, similar to that shown in Fig. 4 of a shape to fit within the container. An elastic band is then placed around the center of the longer sides of the support 61 and any articles that may be placed thereon as shown in Fig. 10 and inserted within the container through the bottom opening. The elastic band appearing within the large window 48 is then lifted over the long sides 79 and 80 and placed within the grooves 82 and notches 83 and 84. The support 61 and the articles thereon is thereby securely held in position within the container by the elastic band which exerts an upward pressure upon the support 61 and the articles thereon. The articles are continually moved upward as each article appearing beneath window 48 is removed through the opening 62. The bottom 127 is inserted within the container so that the cutouts 129 clear the elastic band. By inserting the bottom 127 a compartment is created for used articles which may be inserted through the opening 58.

Referring to Fig. 24, numeral 130 indicates a blank to form a container preferably formed of cardboard or other suitable material. This blank 130 comprises two large portions 131 and 132 forming the long sides of the container. Sides 131 and 132 are divided by a narrower portion 133 forming one of the narrower sides and designed by crease lines 134 and 135. At the ends of long sides 131 and 132 are narrower portions 136 and 137 respectively, of the same width as sides 131 and 132, each portion being one-half the width of narrow side 133 and divided by crease lines 138 and 139, respectively, forming the side opposite side 133.

Extending from the longer part of one of the sides as 131, there is an extending portion 140 forming the top, divided by crease line 145. Extending from the outer edge of top 140 there is a portion 141 divided by crease line 142. Extending from the side opposite portion 141, there is another portion 143 divided by crease line 144. Between crease line 145 and portions 141 and 143, slots 62 are formed. A cutout 48 is made in top 140 of any desired shape. From the narrow side 133, there is an extending portion 146, divided by crease line 147 forming the bottom of the container. From the bottom 146 and extending from the long sides there are narrow flaps 148 and 149 divided by crease lines 150 and 151, respectively. From the end of bottom 146, there is a flap 152 divided by crease line 153. In the center and at the lower edges of sides 131 and 132 there are right angle notches 154 and 155, respectively. Near the lower crease line 147 and in the narrow side 133 there is an opening 58.

To assemble the container formed from blank 130, the sides 131 and 132 are folded at crease lines 135 and 134, respectively, and sides 136 and 137 are folded at crease lines 138 and 139, respectively, abutting one another. Top 140 is folded at crease line 145, covering the four sides of the container and portion 141 is folded at crease line 142 covering portions 136 and 137 and being joined to said portions. Portion 143 is folded at crease line 144 and inserted within the container and joined to the inside of side 133. This type of container is loaded and operates in the same manner as described for the container shown in Fig. 25. The elastic band rests within notches 84, 154 and 155. Bottom 146 is folded at crease line 147 and the long and narrow flaps 148, 149 and 152 are folded at crease lines 150, 151 and 153, respectively, and inserted within the container, thus closing the bottom and forming a compartment for articles. This type of container functions in the same manner as described aforesaid for Fig. 25.

Figures 26, 27, 28, 29:
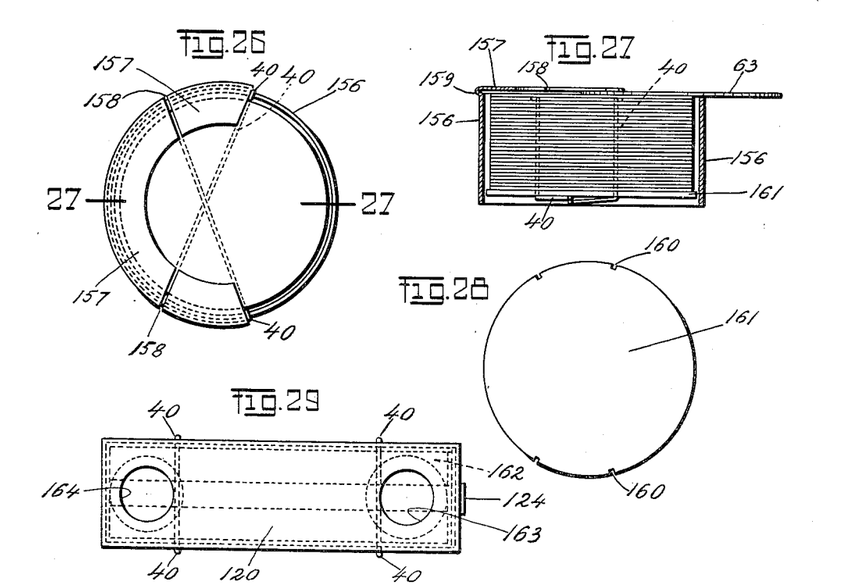
Fig. 26 is a plan view of a round container.
Fig. 27 is a section taken through line 27—27 of Fig. 26.
Fig. 28 is a plan view of movable support to fit within the container shown in Fig. 26.
Fig. 29 is a plan view of the bottom of a combination cigarette and coin holder container.

Referring to Fig. 26, numeral 156 represents the wall of a round container having a flange stop 157 against which the rising articles are stopped before removal. An elastic band 40 is crossed over the opposite side of the flange stop 157 and held in position by notches 158 and the outside ridge 159 of said flange stop 157. In Fig. 26, the flange stop 157 runs partly around the container and the wall opposite the flange, being below the level of the flange 157 allows articles within the container to be consecutively removed. The flange may run entirely around the container with an opening (not shown) directly beneath the ridge 159 of the flange 157 for removal of articles.

To assemble the container shown in Fig. 26, the elastic band is placed within the notches 160 of the support 161 shown in Fig. 28 and articles are then placed upon the support 161. The elastic band 40 is then lifted through the opening in the top of the container, through notches 158 and placed behind the ridge 159 of the flange stop 157. The elastic band 40 exerts an upward force upon the support 161 and the articles. Articles may then be consecutively removed from the container over the wall below the level of the flange 157.

Figure 18:
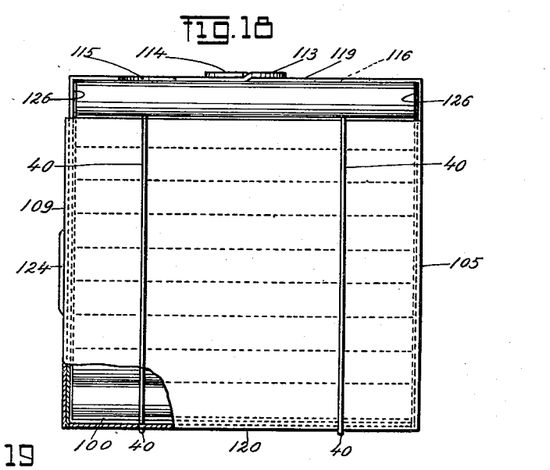
Fig. 18 is a side view of the container shown in Fig. 17, partly broken away and showing the parts held together.
Figure 19:
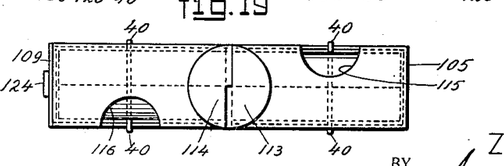
Fig. 19 is a top view of the container shown in Figs. 17 and 18.
Figure 30:
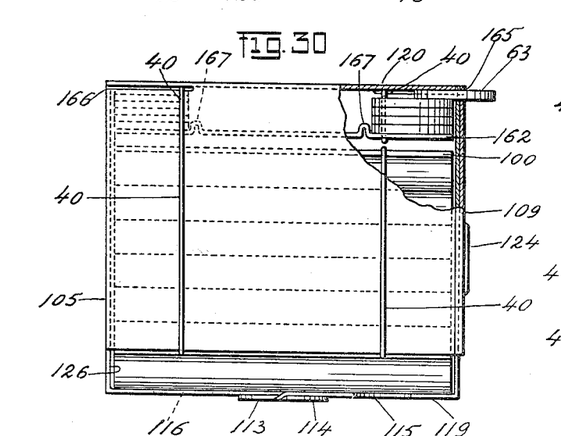
Fig. 30 is a side elevation of the combination cigarette and coin holder container shown in Fig. 29, the sides being partly broken away.
Figure 31:
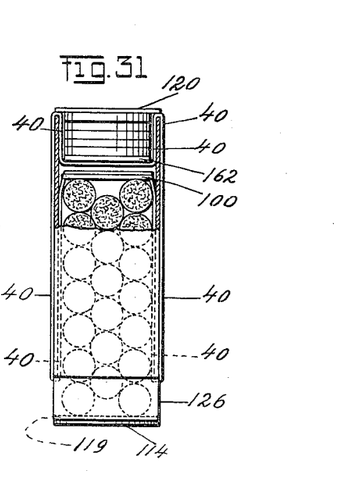
Fig. 31 is an end view of the combination cigarette and coin holder container shown in Figs. 29 and 30.

Referring to Fig. 30, the container shown is the same type of container as shown in Fig. 18, except that Fig. 30 shows a combination cigarette and coin holder container. For the purpose of illustration, the container shown in Figs. 30 and 31 is pictured up side down. An additional movable support 162 is provided resting upon elastic bands 40. The bottom 120 is provided with cutout openings 163 and 164 and the sides 105 and 109 with openings 165 and 166.

To assemble the coin holder in the bottom compartment of the combination cigarette and coin holder shown in Figs. 29, 30 and 31, the elastic bands running over the open bottom receive support 162, containing ridges 167. Support 162 is then covered by bottom 120, containing openings 163 and 164 and pasted to the walls of the container. Coins or similar articles may be inserted through openings 165 and 166. Each elastic band 40 exerts a force against the support 100 and an opposite force against support 162. Articles, such as cigarettes, may be consecutively removed through opening 126 and coins or similar articles may also be consecutively removed through openings 165 and 166.

Figure 32:
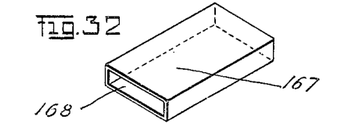
Fig. 32 is a perspective view of a hollow partition.

Fig. 32 shows a partition 167 used as a support and having a hollow compartment 168. This partition 167 may be used within the container in place of supports 100 or 162. An opening (not shown) in a side of the container permits the insertion of articles into the compartments.

While I have described my invention in preferred forms, I desire it to be understood that modifications may be made for various types of containers and articles and that no limitations upon the invention are intended than are imposed by the scope of the appended claims and such claims should be construed as broadly as permissible in view of the prior art.

I claim:

1. A container for articles having a movable partition, comprising two longitudinal legs of equal height and area, said partition creating two compartments, elastic bands for creating an upward force upon said movable partition, said compartments changing their cubic area in the same ratio with the rising and descending of said movable partition.

2. In a new article of manufacture, a container comprising an inner structure unit, two opposite sides of which are shorter in height than the two other sides, notches in the edges of said narrower sides, elastic bands in said notches running parallel to said wider sides of said inner structure unit and embracing said inner structure unit a movable platform upon said elastic bands and within said inner structure unit, said unit conforming to the interior shape of said unit whereby articles are held under tension of said elastic bands, an outer cover to hold said inner structure unit and articles placed within said inner structure unit, said outer cover containing a window, an opening in a side of said outer cover adjacent said window for consecutively removing articles appearing within said window.

3. In a new article of manufacture, a container comprising an inner structure unit, two opposite sides of which are shorter in height than the two other sides, notches in the edges of said narrower sides, elastic bands in said notches running parallel to said wider sides of said inner structure unit and embracing said inner structure unit a movable platform upon said elastic bands and within said inner structure unit, said unit conforming to the interior shape of said unit whereby articles are held under tension of said elastic bands, an outer cover to hold said inner structure unit and articles placed within said inner structure unit, said outer cover containing a window, an opening in a side of said outer cover adjacent said window for consecutively removing articles appearing within said window, two compartments within said inner structure unit formed by said movable platform, an opening within said outer cover for inserting articles within one of the compartments.

4. In a new article of manufacture, a container comprising an inner structure unit, two opposite sides of which are shorter in height than the two other sides, notches in the edges of said narrower sides, elastic bands in said notches running parallel to said wider sides of said inner structure unit and embracing said inner structure unit a movable platform upon said elastic bands and within said inner structure unit conforming to the interior shape of said inner structure unit and having a pair of legs forming the sides of a compartment and acting as a stop for said movable platform whereby articles are held under tension of said elastic bands, an outer cover to hold said inner structure unit and articles placed within said inner structure unit, two compartments within said inner structure unit formed by said movable platform, an opening within the outer cover for inserting articles within one of the compartments, a window in the top of said outer cover, an opening in a side of said outer cover adjacent said window for consecutively removing articles appearing within said window.

5. An inner structure unit for a container formed from a blank having two large cutouts on the same side thereof, crease lines at the beginning and end of each of said cutouts and running across the width of said blank a portion extending from one end portion, one long side and two portions sufficiently long to overlap one another to form another long side of the same height and width as said long side when joined together said extending portion for overlapping the opposite portion, notches along the free edges of said side walls and on opposite sides of said short sides and spaced equally distant from the crease lines of said short sides, said notched short sides being of equal area.

6. An outer cover for a container formed from a blank having a central portion rectangular in shape forming the top of said container, windows in said top, two portions on both long sides of said central portion equal in area and divided by crease lines, two portions at the end of the long side of said last named sides sufficiently large to overlap one another to form a bottom upon overlapping one another of the same area as said central top portion when joined together, a portion of the same width as the short side of said rectangular central portion and extending therefrom divided by a crease line and a flap at the end of said side portion opposite said central portion divided by a crease line and when said flap is inserted within said outer container it forms a side at the short side of said container, another side extending from the short side of one of the sides extending from the central portion divided by a crease line and a flap at the end of said side formed by a crease line, an opening between the crease lines forming said side and said flap, said last named side being slightly narrower in width than said side to which it is attached and upon inserting said last named flap within the container another end side is formed creating a slot adjacent the top for removing articles.

ZEMACH AUERBACH.